United States Patent [19]

Sank

[11] Patent Number: 4,690,127

[45] Date of Patent: Sep. 1, 1987

[54] CATALYTIC COMBUSTION DEEP FAT FRYER

[75] Inventor: Gerald W. Sank, Pasadena, Md.

[73] Assignee: Vulcan-Hart Corporation, Louisville, Ky.

[21] Appl. No.: 931,019

[22] Filed: Nov. 17, 1986

Related U.S. Application Data

[63] Continuation-in-part of Ser. No. 734,844, May 16, 1985, abandoned.

[51] Int. Cl.⁴ .............................................. A47J 27/00
[52] U.S. Cl. ..................................... 126/391; 99/403; 431/328; 126/375
[58] Field of Search ....................... 126/390, 391, 375; 431/284, 326, 328; 99/339, 403

[56] References Cited

U.S. PATENT DOCUMENTS

| | | | |
|---|---|---|---|
| 2,251,111 | 7/1941 | Brown | 126/391 |
| 2,431,753 | 12/1947 | Holderle et al. | |
| 2,543,835 | 3/1951 | Dewey | 126/391 |
| 2,569,112 | 9/1951 | Miller et al. | 126/376 |
| 2,617,407 | 11/1952 | Johnson | 126/391 |
| 2,712,308 | 7/1955 | Keating | 126/391 |
| 2,930,405 | 3/1960 | Welsh | |
| 3,191,659 | 6/1965 | Weiss | |
| 3,229,747 | 1/1966 | Ayers | 431/328 |
| 3,425,675 | 2/1969 | Twine | 431/328 |
| 3,823,704 | 7/1974 | Davgirda et al. | |
| 3,970,072 | 7/1976 | Chipchase | |
| 4,113,009 | 9/1978 | Meyer et al. | |
| 4,154,568 | 5/1979 | Kendall et al. | |
| 4,214,627 | 7/1980 | Kunkel | |
| 4,318,392 | 3/1982 | Schreiber et al. | |
| 4,397,299 | 8/1983 | Taylor et al. | 126/391 |
| 4,400,152 | 8/1983 | Craig et al. | |
| 4,412,523 | 11/1983 | Schreiber et al. | |
| 4,481,873 | 11/1984 | Keating | 126/391 |
| 4,519,770 | 5/1985 | Kesselring et al. | 431/328 |

FOREIGN PATENT DOCUMENTS

| | | | |
|---|---|---|---|
| 686473 | 5/1964 | Canada | 431/328 |
| 2098463J | 11/1982 | United Kingdom | 99/403 |

OTHER PUBLICATIONS

Infrared and Catalytic Burner Technology Assessment, Acurex Corp., prepared for Gas Research Inst., Chicago, Ill., p. 7-1-14.

Primary Examiner—Samuel Scott
Assistant Examiner—H. A. Odar
Attorney, Agent, or Firm—Laubscher & Laubscher

[57] ABSTRACT

A catalytic combustion and heat transfer device for use in a deep fat fryer is disclosed, characterized by increased efficiency and heat transfer. The device includes a hollow elongated heat exchanger having a generally oval interior cross-sectional configuration. A catalytic burner is mounted within a combustion end of the heat exchanger and a unique core buster and heat exchange fin arrangement is mounted within the flue end of the exchanger. The fin arrangement comprises a plurality of generally U-shaped tapered fins arranged in opposed pairs and connected with the inner side wall surface of the exchanger, with the leg portion of each opposed pair extending toward each other in spaced relation. The core buster is arranged between the opposed pairs of fins in contiguous relation with the free end edges thereof to define a plurality of channels within the fins, respectively. A spark ignition device is mounted adjacent the catalytic burner to ignite a combustion mixture supplied to the burner. Heat and flue gases are deflected by the core buster to the heat exchange fins and fin channels to increase the transfer of heat to the exterior surface of the heat exchanger.

17 Claims, 5 Drawing Figures

CATALYTIC COMBUSTION DEEP FAT FRYER

This application is a continuation of application Ser. No. 734,844, filed May 16, 1985 now abandoned.

BACKGROUND OF THE INVENTION

The present invention relates generally to an improved catalytic combustion and heat transfer device, and specifically to a deep fat fryer heated by the improved catalytic combustion device.

BRIEF DESCRIPTION OF THE PRIOR ART

Catalytic burners are well-known in the patented prior art as evidenced by the U.S. Pat. Nos. 3,191,659, Weiss 4,154,568, Kendall et al. 4,318,392, Schreiber et al. 4,412,523, Schreiber et al. The Schreiber et al patents, for example, disclose elongated cylindrical catalytic burners used as the heating element in a gas fired furnace.

Deep fat fryers are also known in the art as evidenced by the U.S. Pat. No. 4,397,299 Taylor et al. which is owned by Vulcan-Hart Corporation, the assignee of the present invention. Typically, as shown in the Taylor et al patent, infrared burners are mounted externally of a tank which contains the frying oil to be heated by the burners. Alternatively, a pulse combustion heating chamber may be immersed within an oil tank or vessel of a deep fat fryer as shown in application Ser. No. 734,285 filed May 15, 1985.

While the prior catalytic burners normally operate quite satisfactorily, they possess certain inherent limitations which affect their adaptability for use in a deep fat fryer where a localized high temperature is required. Although it has been proposed to place a catalytic burner in a deep fat fryer, a major drawback of such a combination has been the limited heat transfer area provided where the burner is either immersed in or external to the oil to be heated.

The present invention was developed in order to overcome these and other drawbacks of the prior art by providing an improved catalytic burner arranged within a novel heat exchanger adapted for immmersion in the vessel of an open top deep fat fryer in order to heat the oil contained in the vessel.

SUMMARY OF THE INVENTION

Accordingly, it is a primary object of the present invention to provide a catalytic combustion and heat transfer device including a hollow elongated heat exchanger having a generally oval vertical cross-sectional interior configuration, a combustion end portion, and a flue end portion. An elongated, oval catalytic burner is mounted in the combustion end of the heat exchanger with its longitudinal axis corresponding with that of the exchanger. An ignition device is also mounted in the combustion end of the heat exchanger adjacent the catalytic burner. A plurality of U-shaped fins are connected with the inner side wall surface of the heat exchanger in the flue end thereof. The fins are arranged in opposed pairs with the free leg portions of each pair extending toward each other in spaced relation. A core buster is mounted in the heat exchanger between the opposed pairs of fins. A rear portion of the core buster is in contiguous relation with the free end edges of the fin leg portions, thereby defining a channel within each of the fins. A front portion of the core buster extends toward the catalytic burner and deflects heat and combustion gases from the burner into the channels. In accordance with the invention, a greater quantity of heat is transferred to the outer wall surface of the heat exchanger owing to the U-shaped fins and to the reduction in cross-sectional area of the heat exchanger due to the core buster.

According to a more specific object of the invention, the catalytic burner has a generally oval vertical cross-section configuration and is symmetrically arranged within the heat exchanger.

According to a further object of the invention, the length of the leg portions of the U-shaped fins increases in the direction of the flue end of the heat exchanger, whereby the cross-sectional area of the fin channels increases in the direction of the flue end.

It is a more specific object of the invention to immerse the catalytic combustion and heat transfer device in the open top vessel of a deep fat fryer in order to heat the cooking medium contained in the vessel.

According to yet another object of the invention, a combustion mixture of gas and filtered air is provided to the catalytic burner within the fryer, and a temperature responsive electronic control device operates the ignition device to control the operation of the catalytic burner, thereby to maintain the cooking medium at a given temperature.

BRIEF DESCRIPTION OF THE FIGURES

Other objects and advantages of the subject invention will become apparent from a study of the following specification when viewed in the light of the accompanying drawing, in which.

DETAILED DESCRIPTION

Figure 1:
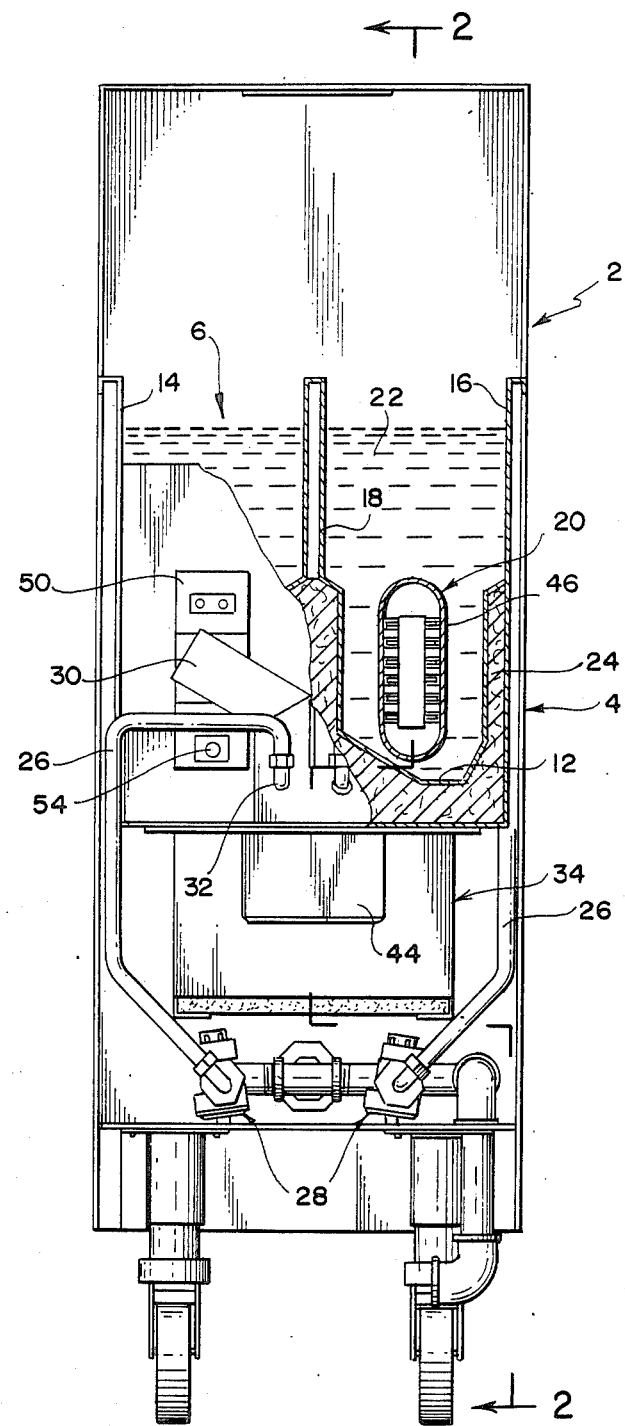
FIG. 1 is a partial sectional front view of a deep fat fryer according to the invention.
Figure 2:
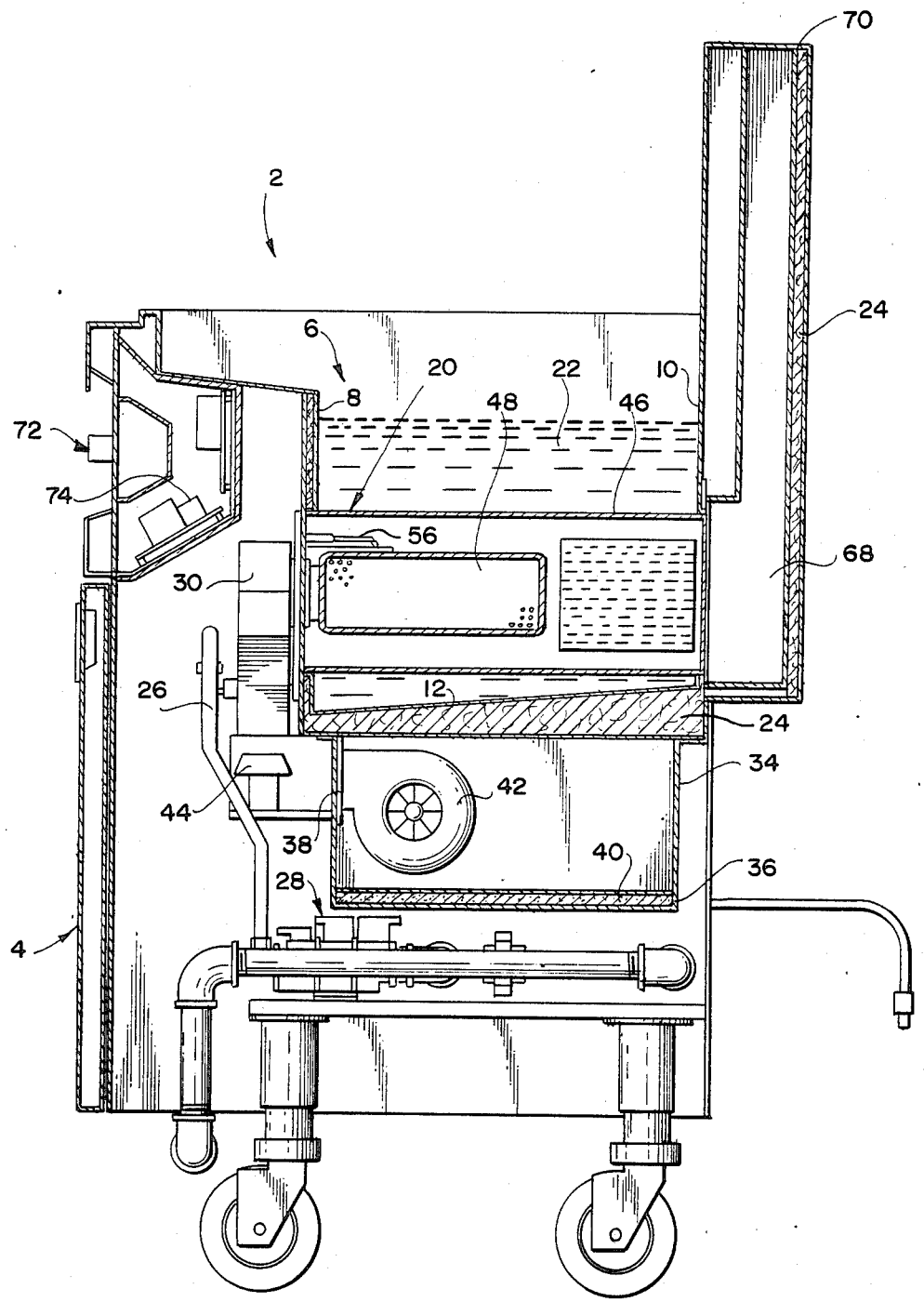
FIG. 2 is a side sectional view of the fryer taken along line 2—2 of FIG. 1.

Referring first to FIGS. 1 and 2, a deep fat fryer containing a catalytic combustion heating device according to the invention is shown. The fryer 2 includes a cabinet 4 containing an open top cooking vessel or vat 6. The vessel is generally rectangular in shape and is defined by a front wall 8, a rear wall 10, an inclined bottom wall 12 to facilitate draining the cooking medium from the vessel, and a pair of side walls 14, 16. A partition 18 may be provided to define two separate vessels, each of which has a catalytic combustion heating device 20 mounted therein as will be developed below.

The partition and walls which define the cooking vessels are formed of an imperforate metal such as stainless steel, whereby the vessels are adapted to be filled with a cooking medium 22 such as oil which completely immerses the heating devices as shown. A suitable heat insulation material 24 such as fiberglass is provided between the vessel walls and the exterior walls of the cabinet 4 to prevent heating of the exposed walls. Insulation is also provided in the partition, in the event that the two vessels are to be maintained at different temperatures or in the event that only one vessel is being used.

A gas supply tube 26 provides a source of gas for combustion, the delivery of the gas being governed by gas controls 28 in a conventional manner. The gas supply tube is connected with a mixer 30 via an injection orifice 32, the mixer being connected with the catalytic combustion heating device 20 as will be set forth in greater detail below.

A closed air entrainment air supply is also connected with the mixer 30, whereby a combustion mixture of gas and air is generated for delivery to the catalytic combustion heating device. More particularly, an air box 34 is arranged within the fryer cabinet 4, preferably beneath the cooking vessel or vessels 6 and insulated therefrom by a layer of insulation material 24. The air box contains inlet 36 and outlet 38 openings. The inlet opening has a filter member 40 connected thereacross, whereby all of the air which passes through the air box has been filtered of minute particulates. A blower 42 is connected within the air box outlet opening 38 and is operable to draw air into the air box through the filter and to force air from the air box via the outlet opening to the mixer 30, where the gas is introduced via the orifice 32. An air adjustment or baffle device 44 is provided adjacent the outlet opening of the air box to meter air delivery to the mixer, thereby to achieve proper air/gas ratios for maximum combustion performance of the catalytic combustion and heating device.

Figure 4:
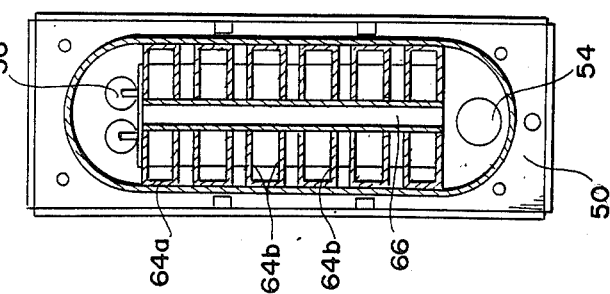
FIG. 4 is an end sectional view of the heat exchanger taken along line 4—4 of FIG. 3.
Figure 3:
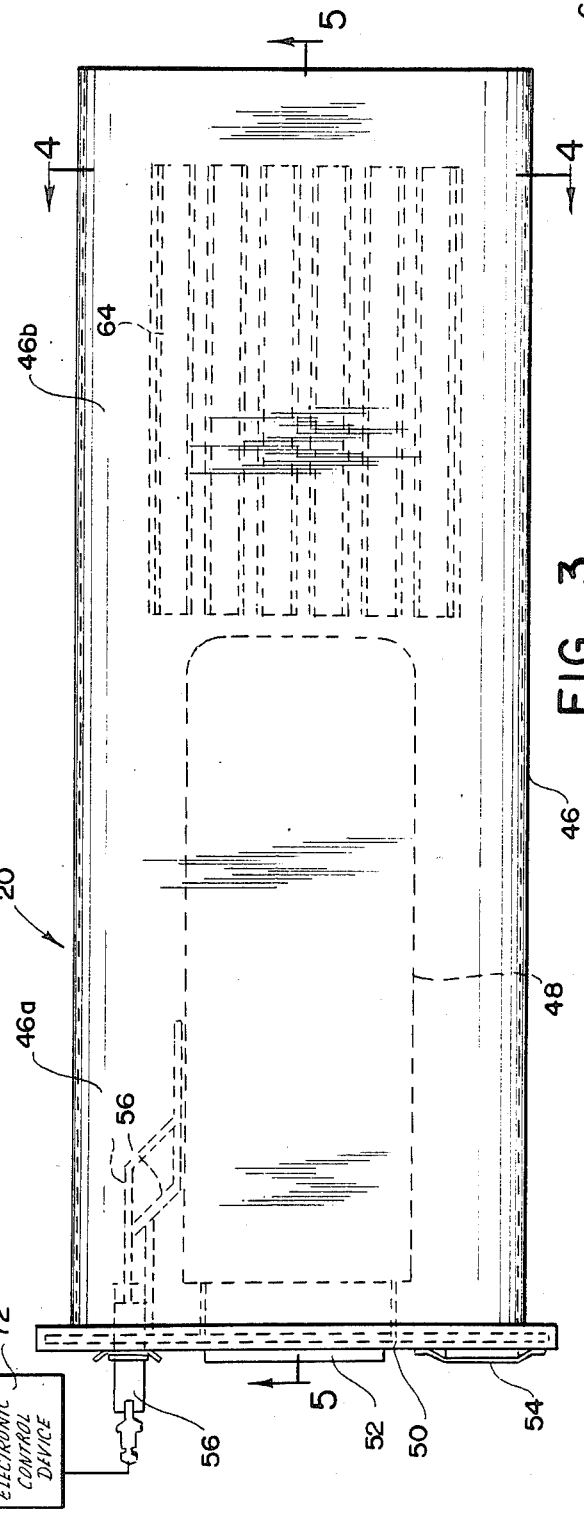
FIG. 3 is a front view of the improved heat exchanger containing a catalytic burner according to the invention.
Figure 5:
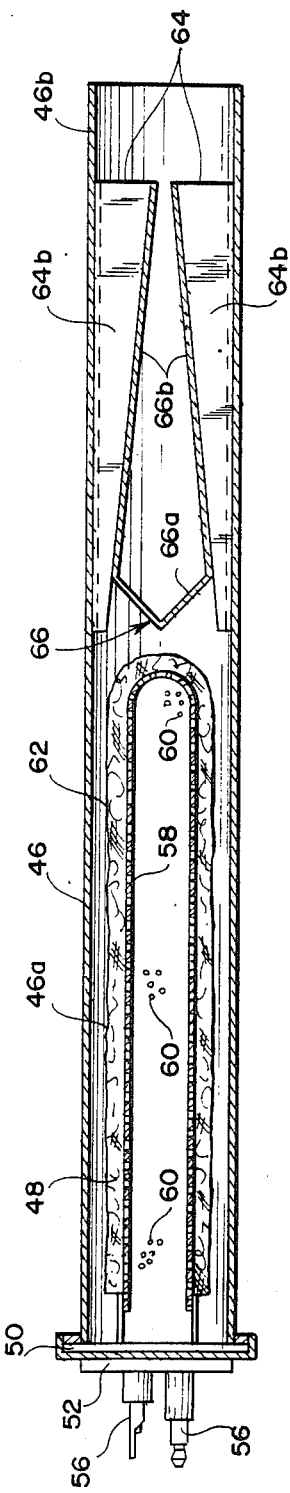
FIG. 5 is a bottom sectional view of the heat exchanger taken along line 5—5 of FIG. 3.

Referring now to FIGS. 3, 4, and 5, the catalytic combustion and heating device 20 will be described. The device includes an elongated hollow heat exchanger 46 formed of a suitable heat transferring metal such as stainless steel. The heat exchanger is open at both ends and includes a combustion end portion 46a and a flue end portion 46b. As shown in FIG. 4, the heat exchanger 46 has a generally oval vertical interior cross-sectional configuration.

A catalytic burner 48 is mounted in the heat exchanger combustion end portion as shown in FIGS. 3 and 5. More particularly, the burner 48 is connected with a mounting plate 50 which in turn is connected with and closes the combustion end of the heat exchanger. The mounting plate includes a fuel supply fitting 52 connected with the mixer 30, whereby the combustion mixture of gas and air may be delivered to the interior of the burner 48 from the mixer. The mounting plate also contains a viewing port 54 to afford inspection of the interior of the heat exchanger during combustion. Finally, a pair of electronic spark ignitors 56 are connected with the mounting plate 50 and arranged adjacent the catalytic burner 48 within the heat exchanger combustion end to introduce spark ignition to the burner.

As shown in FIG. 5, the catalytic burner 48 comprises a hollow shell 58 which is closed at the end remote from the mounting plate 50 and adjacent the heat exchanger flue end 46b. The shell is preferably formed of metal such as stainless steel and has a generally oval vertical cross-sectional configuration. The longitudinal axis of the burner shell corresponds with the longitudinal axis of the heat exchanger, whereby the burner is symmetrically arranged within the heat exchanger combustion end relative to the inner wall surfaces thereof. The hollow shell 58 contains a plurality of apertures 60 across the entire surface thereof, but for the portion adjacent the mounting bracket 50 as shown in FIG. 5. The apertures allow the combustion mixture of gas and air to pass from the interior of the shell to the exterior thereof. A layer of porous fiber matrix material 62 completely covers and is secured to the apertured portion of the exterior surface of the burner shell 58 and absorbs the combustion mixture transmitted via the apertured shell. Alternatively, the end portion of the burner shell need not be apertured and covered with fiber matrix material, whereby the combustion mixture will be transmitted only through the longitudinal portions of the shell. Upon ignition of the spark ignitors 56, the catalytic burner produces infrared type radiant heat within the combustion end portion of the heat exchanger.

As set forth above, the catalytic burner preferably has an oval cross-sectional configuration which provides a greater BTU output. Of course, a conventional cylindrical catalytic burner may be substituted for the oval burner if desired, although less infrared type radiant heat would be generated thereby.

A plurality of heat exchange fins 64 are provided in the flue end portion 46b of the heat exchanger 47 as shown in FIGS. 3 and 5. Each fin has a generally U-shaped configuration including a base 64a and a pair of leg portions 64b extending generally normal to the base. The base 64a of each fin is preferably spot welded to the inner side wall surface of the heat exchanger, with the fins being arranged in opposed pairs as shown in FIG. 4. More particularly, the leg portions 64b of each opposed pair of fins extend toward but remain spaced from one another as shown. The adjacent fins on each side wall are also preferably spaced from each other.

The leg portions of each fin are preferably linearly tapered as shown in FIG. 5. More particularly, the length of the leg portions of each fin increases in the direction from the combustion end portion 46a to the flue end portion 46b of the heat exchanger 46. Each fin is formed of a suitable heat transfer metal, preferably stainless steel.

A core buster 66 is arranged between the opposed pairs of heat exchange fins. The core buster is preferably formed of a high temperature stainless steel material and includes integral front 66a and rear 66b portions. The core buster rear portion extends longitudinally of the heat exchanger 46 in contiguous relation with the free end edges of the fin leg portions 64b as shown in FIGS. 4 and 5. The core buster rear portion thus defines a channel within each of the fins, as well as a channel between each fin, the cross-sectional area of each channel increasing in the direction of the flue end of the heat exchanger. The core buster front portion 66a has a generally V-shaped horizontal cross-sectional configuration which diverges in the direction of the heat exchanger flue end. Accordingly, the front porton 66a of the core buster deflects heat and exhaust from the combustion end portion 46a of the heat exchanger into the channels of and between the heat exchanger fins 64.

The heat exchanger normally has a large interior cross-sectional area for venting of the exhaust gases. As shown in FIG. 5, the core buster 66 decreases the interior cross-sectional area of the heat exchanger at the location between the combustion and flue portions thereof, the cross-sectional area gradually increasing through the heat exchange fin area and returning to a full cross-sectional area at the flue outlet end of the heat exchanger. In accordance with the core buster and fin design of the invention, the core buster directs heat to the fins and slows the heat and flue gases down to promote increased heat transfer through the fins and the exterior wall of the exchanger. This scrubbing action of the flue gases provided by the core buster enhances heat transfer to the cooking oil in the fryer vessel, thereby increasing the efficiency of the device. Moreover, owing to its unique construction, the core buster also emits infrared radiant heat.

Returning now to FIGS. 1 and 2, the fryer cabinet 4 further includes a flue box 68 which recieves flue gases from the heat exchanger 46 and transfers them to an exhaust vent 70 when the gases are expelled from the fryer.

The fryer also includes a temperature responsive electronic control device 72 which controls the operation of the spark ignitors 56. When a temperature sensor (not shown) in the vessel detects that the temperature of the cooking medium is below a given value, it provides a signal to the electronic control device 72 to operate the spark ignitors causing the catalytic burner to produce additional heat. A small cooling fan 74 circulates air around the electronic control device for cooling purposes.

OPERATION

With the gas controls 28 open, the blower 42 actuated under control of the device 72, and the air adjustment baffles adjusted, gas and filtered air are simultaneously delivered to the mixer 30 in the appropriate air/gas ratio to produce a combustion mixture. The mixture is delivered from the mixer to the interior of the catalytic burner 46 via the supply fitting 52. The combustion mixture passes into and through the porous fiber matrix layer of the burner where it is ignited by the spark ignitors under control of the electronic control device 72 in response to a demand for heat. The heat and flue gases generated by combustion of the mixture within the combustion end portion 46a of the heat exchanger pass to the core buster 66 for deflection to the fins 66 and into the channels defined thereby. Heat is transferred by the fins to the external surface of the heat exchanger. Furthermore, heat is transfered directly to the heat exchanger outer surface from the combustion end portion thereof. The heat generated from the catalytic burner and heat exchange device 20 is used to heat the cooking medium contained in the fryer vessel 6, with food in a basket (now shown) being immersed in the medium for cooking. The flue gases resulting from combustion pass from the fin channels and exit the heat exchanger to the flue box 68 and exhaust vent 70.

While in accordance with the provisions of the Patent Statute the preferred forms and embodiments of the invention have been illustrated and described, it will be apparent to those skilled in the art that various changes and modifications may be made without deviating from the inventive concepts set forth above.

What is claimed is:

1. A deep fat fryer, comprising
   (a) an open-top vessel adapted to hold a quantity of cooking oil;
   (b) heater means for heating the oil in said vessel, said heater means including
      (1) hollow, elongated heat exchange means arranged within said vessel and adapted for immersion in the oil, said heat exchange means having a generally oval interior vertical cross-sectional configuration, a combustion end portion and a flue end portion;
      (2) fiber matrix burner means mounted within said heat exchange means and closing the combustion end thereof, said burner means having a generally oval vertical cross sectional configuration, the longitudinal axis of said burner means corresponding with the longitudinal axis of said heat exchange means, whereby said burner is symmetrically arranged within said heat exchange means;
      (3) ignition means mounted within said heat exchange means adjacent said burner means;
      (4) a plurality of generally U-shaped fins connected with the opposite sides of said interior wall surface of said heat exchange means at the flue end thereof, each of said fins including a base portion connected with said interior side wall surface and a pair of leg portions extending inwardly toward and spaced from the leg portions of a corresponding fin connected with the opposite side of said interior wall surface, whereby said fins are arranged in opposed pairs; and
      (5) core buster means arranged between said opposed pairs of fins, said core buster means including
         (i) a rear portion extending longitudinally of said heat exchange means in contiguous relation with the end edges of said fin leg portions, thereby to define a channel within each of said U-shaped fins; and
         (ii) a front portion integral with said rear portion and extending toward said burner means for deflecting heat and exhaust from said burner means into said channels, whereby a greater quantity of heat is transferred to the outer wall surface of said heat exchange means owing to the U-shaped fins and to the reduction of cross-sectional area of said heat exchange means due to said core buster means; and
   (c) means for supplying a combustion mixture of gas and air to the interior of said fiber matrix burner means, whereby upon operation of said burner means, heat from said heat exchange means is used to heat the oil to a given temperature.

2. Apparatus as defined in claim 1, wherein said fiber matrix burner means comprises
   (a) a hollow metal shell closed at the end thereof adjacent said heat exchange flue end, said shell containing a plurality of apertures to allow said combustion mixture of gas and air to pass therethrough; and
   (b) a layer of fiber matrix material secured to the outer surface of said shell.

3. Apparatus as defined in claim 2, wherein said layer of fiber matrix material contains a catalyst.

4. Apparatus as defined in claim 3, wherein said combustion mixture supply means comprises
   (a) mixing means connected with said fiber matrix burner means;
   (b) gas supply means connected with said mixing means; and
   (c) air supply means connected with said mixing means, said air supply means including
      (1) an air box having inlet and outlet openings, said outlet opening being connected with said mixing means;
      (2) filter means connected with said air box inlet opening for filtering air delivered to said box; and
      (3) blower means connected with said air box outlet opening for drawing air into said air box through said filter means and for supplying said filtered air to said mixing means.

5. Apparatus as defined in claim 4, wherein said air supply means further includes means for controlling the volume of air delivered to said mixing means.

6. Apparatus as defined in claim 5, and further comprising electronic control means responsive to the temperature of the oil for operating said ignition means to control the operation of said burner means, thereby to maintain the oil at the given temperature.

7. Apparatus as defined in claim 6, and further comprising flue means connected with said heat exchange flue end for expulsion of exhaust from said heat exchange means.

8. Apparatus as defined in claim 7, wherein the length of said fin leg portions increases in the direction of said heat exchange flue end, whereby the cross-sectional area of each of said fin channels increases in the direction of said flue end.

9. Apparatus as defined in claim 8, wherein said fins are mounted in spaced relation to define further channels between adjacent fins.

10. Apparatus as defined in claim 8, wherein said core buster front portion has a generally V-shaped horizontal cross-sectional configuration and diverges from said heat exchange combustion end toward said flue end.

11. Apparatus as defined in claim 10, and further comprising ignition means arranged within said combustion end of said heat exchange means adjacent said catalytic burner means for igniting the gas and air mixture.

12. Apparatus as defined in claim 10, wherein said U-shaped fins are formed of stainless steel material to increase the heat transfer thereof.

13. Apparatus as defined in claim 12, wherein said core buster means is formed of high temperature stainless steel material.

14. A deep fat fryer, comprising
  (a) an open-top vessel adapted to hold a quantity of cooking oil;
  (b) heater means for heating the oil in said vessel, said heater means including
    (1) hollow, elongated heat exchange means arranged within said vessel and adapted for immersion in the oil, said heat exchange means having a generally oval interior vertical cross-sectional configuration, a combustion end portion and a flue end portion;
    (2) fiber matrix burner means mounted within said heat exchange means and closing the combustion end thereof, said burner means having a generally oval vertical cross sectional configuration, the longitudinal axis of said burner means corresponding with the longitudinal axis of said heat exchange means, whereby said burner is symmetrically arranged within said heat exchange means;
    (3) ignition means mounted within said heat exchange means adjacent said burner means;
    (4) fin means connected in spaced relation with said interior wall surface of said heat exchange means at the flue end thereof for conducting heat from the interior of said heat exchange means to the wall surface thereof; and
    (5) means supported by said fins for diverting heat and exhaust from said burner means outwardly to said fin means and to said heat exchange interior wall surface via the spaces between said fin means, whereby a greater quantity of heat is transferred to the outer wall surface of said heat exchange means; and
  (c) means for supplying a combustion mixture of gas and air to the interior of said fiber matrix burner means, whereby upon operation of said burner means, heat from said heat exchange means is used to heat the oil to a given temperature.

15. Apparatus as defined in claim 14, wherein said diverting means decreases the interior cross-sectional area of said heat exchange means between the combustion and flue end portions thereof, thereby to promote increased heat transfer through said fin means and the wall of said heat exchange means.

16. Apparatus as defined in claim 15, wherein said diverting means is in contiguous relation with said fin means and extends continously along the length thereof through said heat exchange flue end portion.

17. Apparatus as defined in claim 16, wherein said fiber matrix burner means includes a catalyst.

* * * * *